May 18, 1965

G. S. FARISON 3,184,625

ALTERNATOR RECTIFIER UNIT

Filed May 2, 1960

INVENTOR.
GLENN S. FARISON
BY
Harness and Harris
ATTORNEYS.

May 18, 1965 G. S. FARISON 3,184,625
ALTERNATOR RECTIFIER UNIT
Filed May 2, 1960 7 Sheets-Sheet 4

INVENTOR.
GLENN S. FARISON
BY
Harness and Harris
ATTORNEYS

May 18, 1965  G. S. FARISON  3,184,625
ALTERNATOR RECTIFIER UNIT
Filed May 2, 1960 7 Sheets-Sheet 5

INVENTOR.
GLENN S. FARISON.
BY
Harness and Harris
ATTORNEYS

INVENTOR.
GLENN S. FARISON
BY
Harness and Harris
ATTORNEYS

# United States Patent Office 3,184,625
Patented May 18, 1965

3,184,625
ALTERNATOR RECTIFIER UNIT
Glenn S. Farison, Southfield, Mich., assignor to Chrysler Corporation, Highland Park, Mich., a corporation of Delaware
Filed May 2, 1960, Ser. No. 26,300
21 Claims. (Cl. 310—59)

This invention relates to electrical energy generating machines and particularly to an improved construction for an inductor-type alternator-rectifier unit. The invention not only includes the structural assembly of the alternator-rectifier but also the method of manufacture and assembly of certain of the novel alternator-rectifier components.

It is a primary object of this invention to provide an inexpensive, lightweight, highly efficient, simplified, durable inductor-type alternator unit that is specifically intended to replace the direct current generator that has been in common use in passenger carrying motor vehicles for many years. In the past certain special duty passenger carrying motor vehicles have occasionally used inductor-type alternators and alternator rectifiers because the electrical loads encountered in such vehicles could not be suitably handled by the conventional motor vehicle direct current generator. Police cars, communication vehicles, busses and trucks have been known to use alternators in place of generators to meet their electrical system requirements. The alternators heretofore supplied for commercial and special purpose passenger carrying motor vehicles have been expensive, large size, inefficient, noisy units that did not lend themselves to general passenger carrying motor vehicle application.

This invention relates to an improved type of alternator for producing three phase alternating current that is converted to direct current by silicon diode rectifiers connected to the output of the alternator. Such an alternator-rectifier unit has outstanding performance characteristics for motor vehicle use because it will operate at as much as sixty percent (60%) of its maximum capacity at the slowest engine idling speeds. At the present time the conventional direct current generator supplied automotive electrical systems are taxed to their limit by the large number of electrically operated accessories and vehicle components now utilized on standard types of passenger carrying motor vehicles. It is obvious therefore that not too many other power sapping electrically operated vehicle components need be operated at the same time to force the battery to cut into the electrical system. This, particularly at idling speeds or in slow city traffic causes short battery life as well as frequent battery run-downs. Because the alternator-rectifier unit provides high output at engine idle speeds and also delivers substantially full output at relatively low engine speeds and over a wide speed range, it is ideally suited performancewise for passenger carrying motor vehicle use. The alternator-rectifier unit of the disclosed design is also attractive for passenger car use because of its durability and efficiency. The alternator-rectifier has no commutator, no rotating armature, nor any heavy current-carrying brushes to arc at high speeds. The brushes in the alternator merely have to carry a light field exciting current and these brushes run on smooth surfaced slip rings that are least susceptible to arcing. The alternator rectifier is basically an "inside out" generator with heavy alternating current produced in the stationary windings of its stator when its field coil rotor is energized through its slip ring brushes that are only required to carry a few amperes. The alternator is limited primarily by the maximum permissible speed of its bearings, not by any commutation problems as is the case with direct current generators.

In addition to being a more efficient electrical energy generating system with greater output than the comparable direct current generator, the alternator-rectifier system can be constructed as a lighter weight unit than the comparable D.-C. generator and thus it has both cost and horsepower drain advantages over the D.-C. generator.

It is a particular object of this invention to provide a compact, low cost, highly efficient inductor-type alternator-rectifier unit for direct current having novel means to suppress noise that might otherwise be objectionable to the occupants of a passenger carrying motor vehicle.

It is another object of this invention to provide a stator assembly for an inductor-type alternator composed of pin-connected stacked plates wherein the pin connecting means serves the dual function of a plate connector and also as a spacer means for accurately spacing the opposed sections of the alternator housing or shield assembly.

It is still another object of this invention to utilize the metal of the rotor mounted cooling fans in such a way that the magnetic flux pattern of the rotor field coil is improved by the manner in which the cooling fans are arranged on the rotor shaft to cooperate with the rotor pole cups.

It is still another object of this invention to provide pole piece fingers on the rotor cups that are arranged and shaped in such a manner as to minimize vibrations that might set up objectionable noise characteristics in the alternator unit.

It is still another object of this invention to provide a new and improved type of slip ring assembly as well as a novel method of manufacture thereof.

It is still another object of this invention to provide a new improved, simplified form of adjustable split bearing mounting for support of the alternator unit.

Other objects and advantages of this invention will become readily apparent from a reading of the following description and a consideration of the related drawings, wherein:

FIG. 5 is a schematic wiring diagram for the alternator-rectifier unit;

FIG. 6 is a perspective view of one form of rotor unit for use in this alternator-rectifier;

FIG. 16 is a sectional elevational view, similar to FIG. 1, showing a modified form of alternator having an explosion-proof arrangement for the alternator brushes that is particularly adapted for marine use or any other application where brush sparking might present a hazard.

The disclosed alternator unit is designed to generate alternating current with six silicon diode rectifiers 33 arranged to convert the alternating current to direct current. The silicon diode rectifiers 33 act like one-way valves permitting current flow in one direction only. For this three-phase alternator three of the diodes are of positive polarity to allow positive pulses to pass, the other three of negative polarity and insulated from the first trio, to turn the negative pulses around to provide full-wave rectification. Silicon rectifiers have a very high resistance to the flow of electrical current in one direction, but a very low resistance to current flow in the opposite direction. Therefore, with the proper polarity the low resistance of the diodes allows current to flow from the alternator to the storage battery 34 of the associated electrical system (see FIG. 5). The high resistance prevents current flow from the battery 34 to the alternator. Because current cannot flow from the battery 34 to the alternator the conventional circuit breaker of a vehicle electrical system can be eliminated. Likewise, because the alternator is self regulating no current regulator is needed. These facts, plus the fact that an alternator unit supplies considerably more current than a comparable direct current generator at relatively low driven speeds and is much lighter in weight than the comparable direct current generator that it is designed to replace, clearly bring out the advantages of the alternator over the comparable direct current generator.

Figure 1:
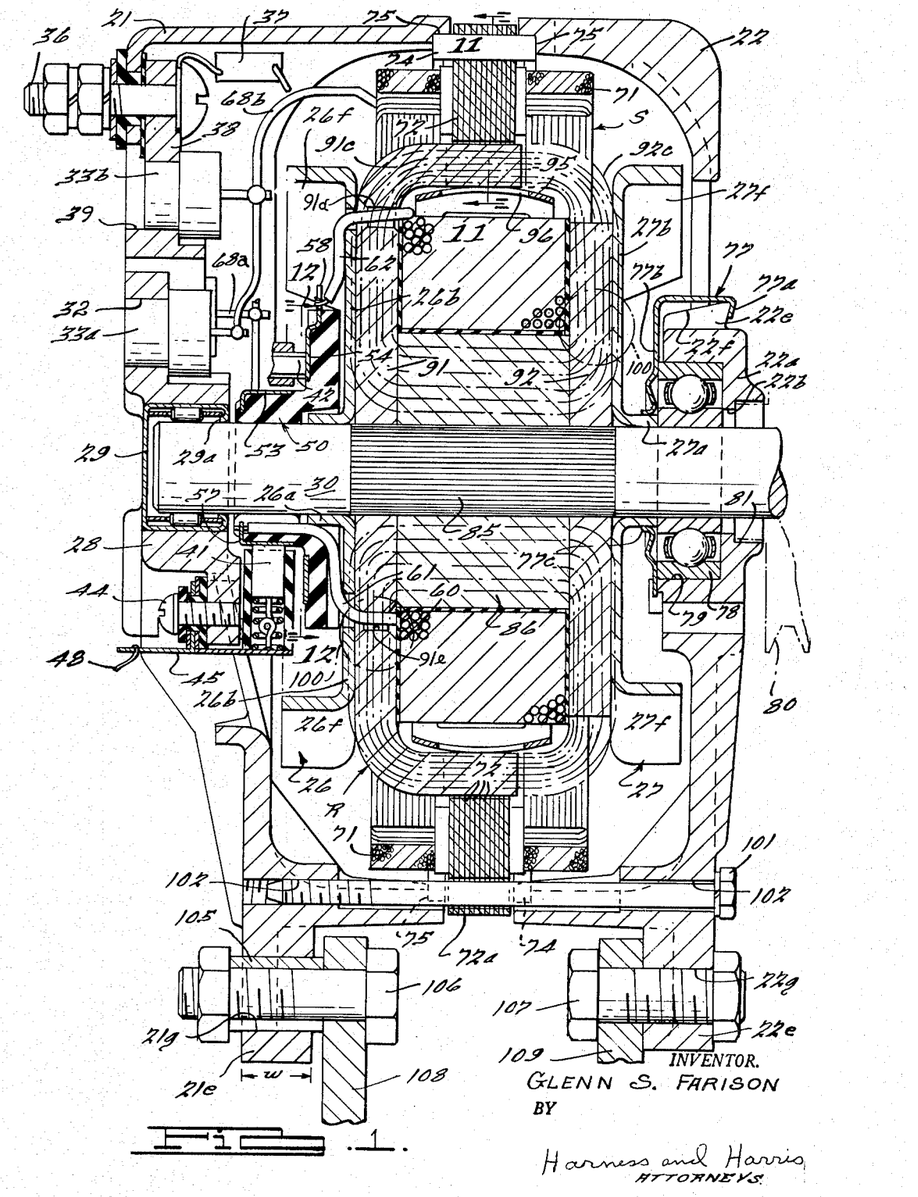
FIG. 1 is a sectional elevational view taken along the line 1—1 of FIG. 2, showing an alternator-rectifier unit embodying this invention, the view having the axially extending slip-ring brush rotated ninety degrees (90°) from its actual position shown in FIG. 3 so that both slip ring brushes would be visible in this view.
Figure 2:
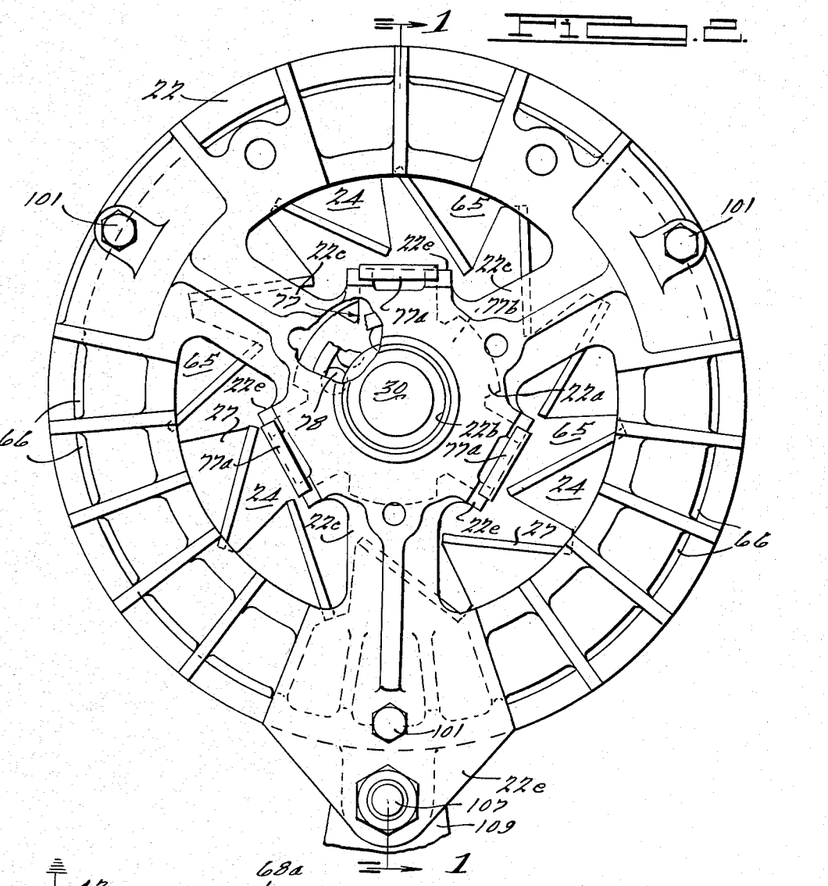
FIG. 2 is an end elevational view looking at the right end of the alternator-rectifier unit shown in FIG. 1.
Figure 3:
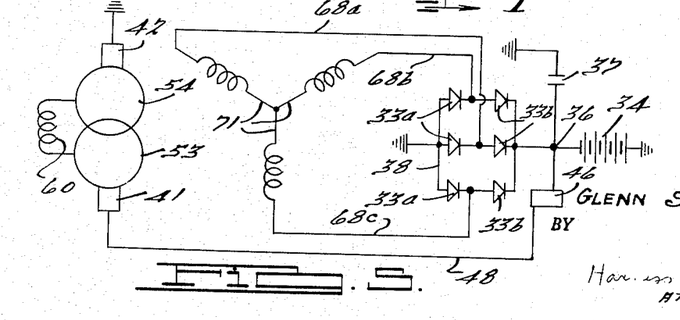
FIG. 3 is an end elevational view looking at the left end of the alternator-rectifier unit shown in FIG. 1.

Looking particularly at FIGS. 1, 2 and 3 of the drawings, it will be seen that this alternator-rectifier unit comprises a pair of slotted housing or shield assemblies 21 and 22 that are axially spaced apart by a stator unit S. Housing piece 21, that is shown at the front or left side of FIG. 1 and shown in elevation in FIG. 3, is denoted the rectifier end of the housing. It includes a plurality of peripherally located slots 23 and a plurality of interiorly arranged slots 24 and 25. These slots 23–25 cooperate with fan elements 26 and 27 fixed to the rotor unit R to provide for the circulation of cooling air through the alternator-rectifier unit during operation thereof. Housing rectifier piece 21 is formed with a rotor shaft bearing seat 28 at its center portion that receives a cup contained roller bearing assembly 29. Roller bearing assembly 29 is preferably mounted in the housing seat 28 by means of a press fit. It will be noted that the edge portion 29a of the bearing cup 29 is turned over to abut and seal against the rotor shaft 30 so as to protect the bearing against damage from the introduction of foreign matter. Bearing 29 is initially packed with lubricant and is intended to be permanently lubricated.

Also included in the housing piece 21 are three bores 32 adapted to receive the three negative polarity rectifiers 33a. A conductor heat sink unit 38 is bolted to the housing piece 21 by bolt assembly 36. Three positive polarity rectifiers 33b are pressed into bores 39 in the heat sink conductor 38. Rectifiers 33a and 33b are preferably of the silicon diode-type even though selenium rectifiers or some other equivalent types could be used in place of the silicon diodes. Each pair of rectifiers 33a and 33b are connected together and to one of the three phase windings 71 (see FIGS. 1 and 3) of the stator S by the conductors 68a, 68b and 68c respectively. The rectifiers 33a and 33b are connected to the battery or standby power source 34 for the electrical system through heat sink conductor 38 that is connected to battery through the screw post terminal 36 in end piece 21. The battery to alternator conductor means (see FIG. 5) has in parallel therewith a surge suppressor condenser 37 that is grounded through the housing piece 21.

Figures 3, 4:
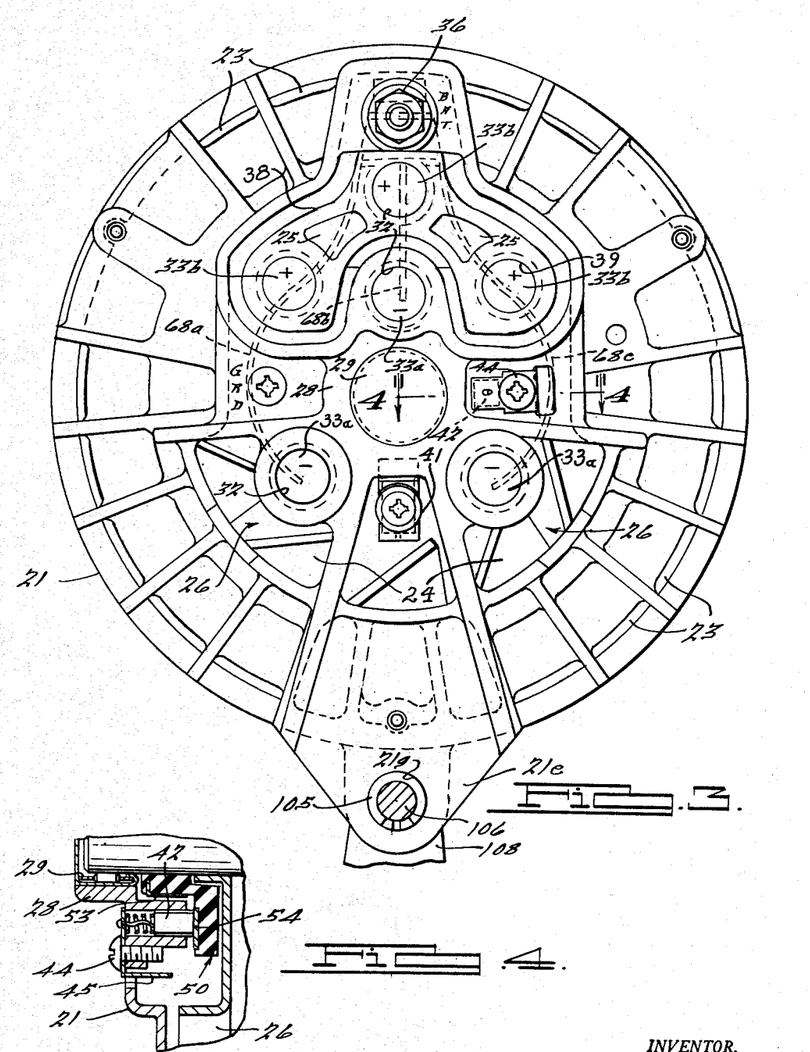
FIG. 4 is a fragmentary sectional elevational view taken along the line 4—4 of FIG. 3 showing details of the axially extending slip ring brush assembly.

Mounted on the housing piece 21 and forming a novel feature of this alternator-rectifier unit are the slip ring brush assemblies 41 and 42 respectively. Brush assembly 41 is designated as a radially extending brush assembly whereas assembly 42 (see FIG. 4) is designated an axially extending brush assembly. These brush assemblies 41 and 42 are fixed to the housing piece 21 by screw means 44 that extend through the mounting pieces 45 for the brush assemblies and threadably anchor in tapped bores in the housing piece 21. The brush assembly 41 is connected to the battery 34 (see FIG. 5) through the voltage regulator 46 by the conductor wire 48. The brush assembly 42 is connected to ground through the housing piece 21.

Figures 12, 13, 14, 15:
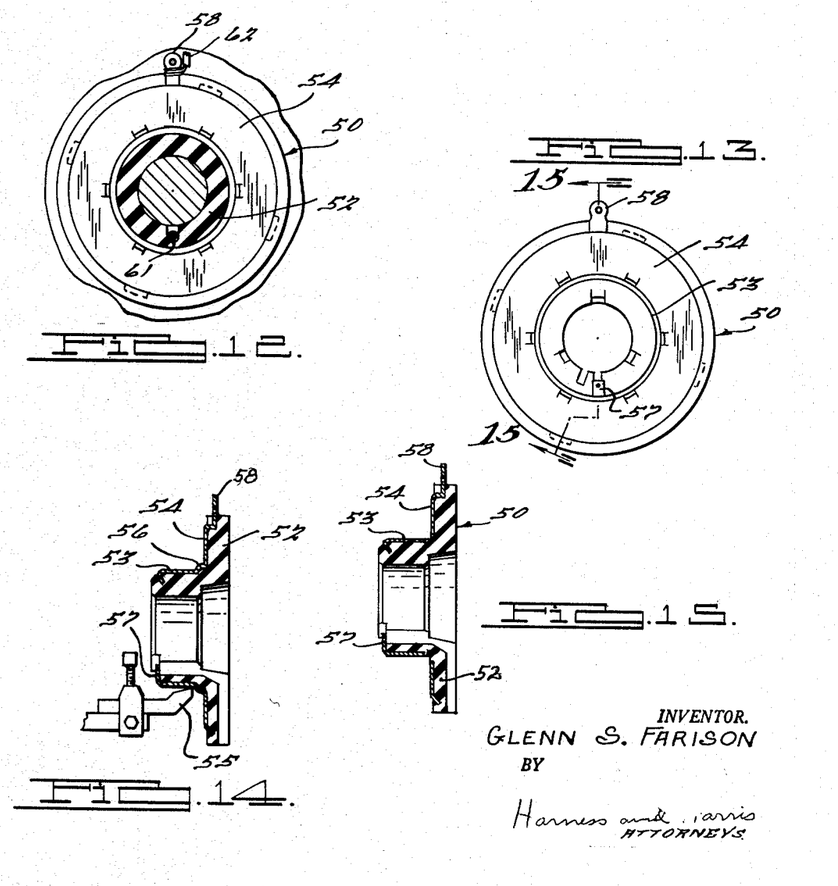
FIG. 12 is a sectional elevational view of the slip ring assembly associated with the rotor of this alternator-rectifier unit, the view being taken along the line 12—12 of FIG. 1.
FIG. 13 is an end elevation of the slip ring assembly shown in FIGS. 1 and 12.
FIG. 14 is a sectional elevational view of the slip ring assembly shown in FIGS. 12 and 13, but showing the slip ring assembly in one stage of its formation.
FIG. 15 is a sectional elevational view taken along the line 15—15 of FIG. 13 showing the slip ring assembly in its finalized form.

The slip ring assembly 50 (see FIGS. 1 and 12–15) that is engaged by the brush assemblies 41, 42 is a substantially cup-shaped unit that is fixed to the rotor shaft 30. Looking at FIG. 14 in particular it will be noted that this brush assembly 50 is formed preferably by lining the inside surface of a pierced conductor metal cup 51 with a permanently attached layer of insulating material 52. Thereafter the lined conductor cup 51 is placed on a lathe or similar metal cutting machine and a tool such as the bit 55 is operated to cut away the bend or fillet portion 56 of the cup 51. After cutting away the portion 56, the metal cup 51 is transformed into two separated right angularly related, ring portions 53 and 54 which provide the contact surfaces arranged for engagement by the brushes 41 and 42. As can be seen clearly from FIG. 1, the slip ring portion 53 that is engaged by brush 41 is provided with a wire connector tab 57 that has one end 61 of the rotor field coil winding 60 connected thereto. The slip ring portion 54 that is engaged by the brush 42 has a wire connector tab 58 that has the other end 62 of the rotor field coil winding 60 connected thereto. From the foregoing description of the brush assemblies 41 and 42 and the associated slip rings 53 and 54, the circuit for energization of the rotor field coil winding 60 is thought to be obvious.

The drive end housing piece 22 (see FIGS. 1 and 2) is generally similar in design to the rectifier end housing piece 21 in that it is slotted at 65 throughout its central or hub area and is slotted at 66 throughout its peripheral area to provide for maximum cooling air flow through the alternator unit by the centrifugal fans 26, 27. The fans 26, 27 suck cooling air into the alternator unit through the hub portion openings 24, 25 and 65 and pass the cooling air across the alternator internal structure and then discharge it through the peripheral housing slots 23, 66.

As can be clearly seen from FIGS. 1 and 2, the end piece 22 is formed with a circular hub portion 22a that is pierced by a bore 22b to receive the drive end of the rotor shaft 30. Extending radially outwardly from the hub portion 22a are three equally spaced struts 22c. Located between the struts 22c on the outer periphery of the hub portion 22a are three bearing clamp seats 22e. The seats 22e are tapered as shown at 22f in FIG. 1 to facilitate the snap-on mounting of the plate-like bearing clamp 77. Clamp 77 has three radially extending arms with flanged outer edge portions 77a that are slidably forced up the tapered seats 22f to snap over the outer ends of the seats 22e. The clamp 77 has a circular hub portion 77b that is adapted to bear against and hold the pre-lubricated ball bearing assembly 78 in the recessed seat 79 in end piece hub portion 22a. In addition to providing a portion 77b to hold the bearing assembly 78 in the recess 79, the clamp 77 has an axially extending flange portion 77c formed at its inner periphery adjacent the bore therein that receives the rotor shaft 30. The clamp flange 77c (see FIG. 1) is adapted to provide a seal against the shaft 30, or the fan 27 thereon, so that foreign matter that might be injurious to the bearing assembly 78 will not enter the bearing from the inner side thereof. The outer side of the bearing assembly 78 is sealed by the hub of the pulley drive wheel 80 that seats in the recess 81 in the housing end piece hub portion 22a. It is thought to be obvious from the foregoing description that the bearing assembly anchor clamp 77 serves a dual function in that in addition to locking the bearing assembly 78 in its housing seat 79, it also seals the inner face of the bearing 78 against the entrance of any harmful foreign matter. Because of this novel clamp and seal construction 77 it is not necessary to use an expensive pre-sealed bearing assembly unit for rotatably mounting the drive end of the rotor shaft 30.

As can be clearly seen from FIG. 1, the two housing pieces 21, 22 are assembled in fixed spaced relationship by having sandwiched therebetween the stator unit S. Stator unit S comprises a stack of annular plates 72 that are maintained in assembled relationship by a group of circumferentially spaced pins 74 that are pressed into aligned mating openings in the stacked plates 72. The pins 74 that connect the stator plates 72 (see FIG. 1) serve a dual function in that they are of predetermined, accurately formed, lengths so as to project outwardly beyond the plates 72 and provide stud portions that seat in bores 75 in the end pieces 21, 22. The housing end pieces 21, 22 are thus accurately spaced apart the prescribed distance by the stator plate assembly pins 74, regardless of minor variations in width of the stacked plate assembly of the stator unit S. By this arrangement the material of the end pieces 21, 22 is reduced to a minimum because the stator peripheral surface 72a is used as a part of the alternator housing. This particular arrangement of the stacked plates 72 and split end housings 21, 22 interconnected by the spacing pins 74 is thought to be a new and novel approach in the design of alternator units or similar devices.

The stacked plates 72 are pierced by circumferentially spaced, radially extending slots 77 (see FIG. 11) that receive the Y-connected coils of insulated conductor wires that form the three phase windings 71 of the stator unit S. The windings 71 are insulated from the stacked metal plates 72 by a suitable coating of insulator material 83 that may be either the result of a dipping process or a spraying process or a material applied by a fluidized bed coating process as set forth in the patent applications of James E. Cserr, Serial No. 784, filed January 6, 1960, now abandoned, and Warren U. Lapham, Serial No. 28,780, filed May 12, 1960, now abandoned. The particular manner in which the windings 71 are applied to the slotted stator plates 72 is not a part of the invention disclosed and claimed in this application. Suffice it to say that one end of each of the three coil wires of the windings 71 is connected to a different pair of diodes 33a, 33b whereas the other ends of each of the three coil wires are connected together by a suitable Y connector (not shown).

The magnetizable rotor unit R that is rotatably mounted in the spaced housing ends 21, 22 comprises the rotor shaft 30 that has its dead end mounted in the bearing assembly 29 and its live or driving end mounted in the bearing assembly 78. Shaft 30 is preferably knurled, grooved or splined, as shown at 85, to assist in drivingly connecting the metallic, magnetizable, rotor hub disc 86 to the shaft 30 by a press-on operation. Surrounding and seated on the outer periphery of the hub disc 86 is the magnetic field coil 60 of the rotor unit R. Pressed on to the shaft 30, so as to abut the sides of the rotor hub 86 and the rotor coil 60, are a pair of metallic, magnetizable, rotor pole pieces 91 and 92 respectively. These pole pieces 91 and 92 are each of substantially cup-shaped formation (see FIG. 9) and comprise an annular disc portion 91a or 92a having a central shaft receiving bore therein such as 91b or 92b. The discs 91a and 92a are provided around their outer periphery with a plurality of, six in this instance, right angularly disposed, axially extending, equally spaced, pole fingers such as 91c and 92c respectively. The pole fingers 91c and 92c are offset circumferentially with respect to each other so that they are arranged in interpolar or circumferentially staggered, interspaced relationship as shown in FIG. 6 particularly. The degree of axial overlap of the free ends of the pole pieces 91c, 92c is also thought to be clearly shown in FIG. 1. From FIG. 1 it is obvious that the coil spaced rotor pole pieces 91, 92 with the interlaced pole fingers 91c, 92c provide a substantially closed casing about the magnetic field coil 60.

Figure 9:
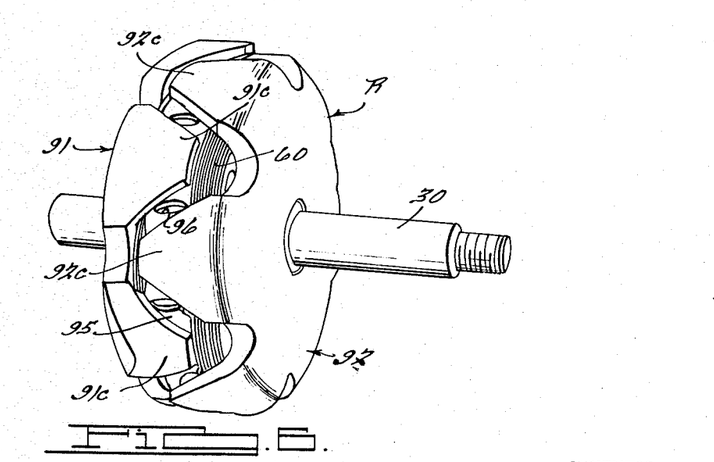
FIG. 9 is an exploded sectional elevational view of the rotor cups, fan and noise damping ring used in the rotor shown in FIGS. 1 and 6.
Figure 11:
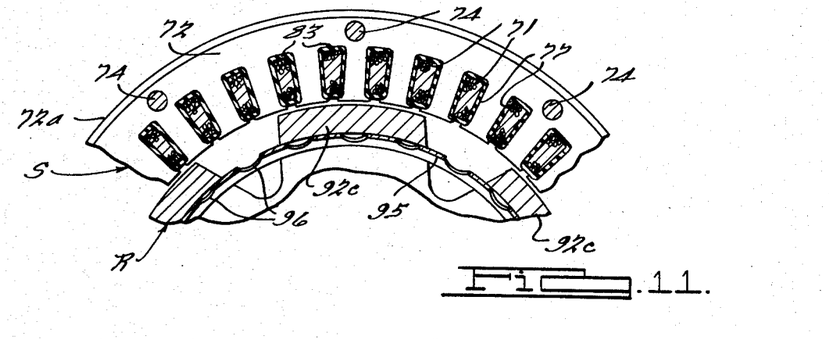
FIG. 11 is a fragmentary sectional elevational view of the stator unit utilized with this alternator-rectifier unit, the view being taken along the line 11—11 of FIG. 1.

The pole pieces 91, 92 are of relatively thin stock for their particular purpose and for that reason they are adapted to be fashioned by a stamping process that is quite economical. While the lightweight economical pole construction utilized in this alternator is quite advantageous, still, it could introduce noise problems due to vibration of the plates 91a, 92a and the pole fingers 91c, 92c if means were not provided to frictionally damp such vibrations. A novel means of damping any noise vibrations that might arise from this type of rotor construction is shown in FIGS. 1, 9 and 11 particularly. It will be noted that a strip-like ring 95 having circumferentially spaced slots 96 is arranged within the rotor cups 91, 92 such that the ring 95 will be radially compressed by engagement with the undersides of the pole fingers 91c and 92c. As can be clearly seen from FIG. 1, the strip from which the sound damping ring 95 is formed is outwardly convex in cross-sectional configuration so that its central portions are slightly flattened by compressive engagement with the undersides of the pole fingers 91c, 92c. The frictional engagement between ring 95 and pole fingers 91c, 92c has been found to effectively damp both the radial and axial vibrational tendency of the rotor cups 91, 92 and to render this alternator unit commercially acceptable from a noise standpoint for use in passenger carrying vehicles.

Figures 9A, 10:
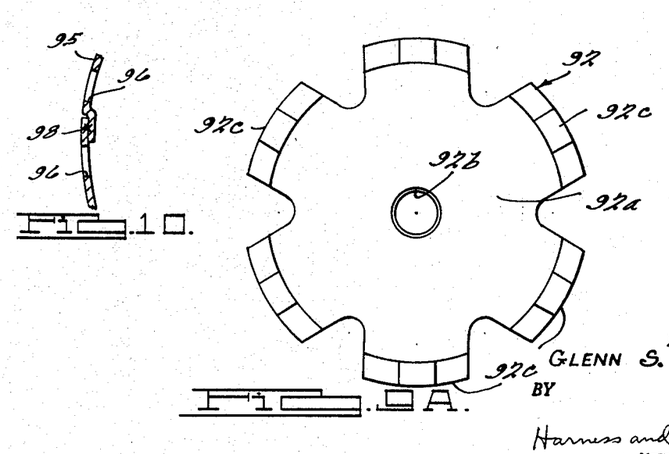
FIG. 9a is an interior side elevational view of one of the rotor pole cups shown in FIG. 9.
FIG. 10 is a fragmentary sectional elevational view taken along the line 10—10 of FIG. 9.

The slots 96 in the ring 95 render the ring strip sufficiently flexible so that it will not buckle when it is radially compressed to be mounted concentrically within the rotor cup pole fingers 91c, 92c. The sound damping ring 95 can be formed from a length of slotted, prearched, metal stripping that has its ends overlapped and spotwelded together at 98 as shown in FIG. 10. While a preferred form of sound damping strip 95 is shown in this alternator construction, still, it is to be understood that there are other forms of sound damping strips that can also be used as clearly set forth in the copending application of Kenneth A. Graham, Serial No. 144,156, filed October 10, 1961.

Another novel feature of this invention relates to the construction and arrangement of the alternator cooling fans 26, 27 that form a part of the rotor unit R. As has been obvious from the foregoing description of this alternator unit, the design is directed towards the utilization of the minimum amount of material which result has been achieved through the use of different components for dual functions. The fans 26, 27 which are magnetizable metal stampings that are attached by a press fit to the rotor shaft 30, each have an outwardly directed, axially extending, centrally located, flange portion 26a or 27a. The flange 27a of fan 27 is adapted to be sealingly engaged by the flange 77c of the bearing clamp 77 as has been previously described. The flange 26a of fan 26 is arranged to extend along the rotor shaft 30 beneath the slip ring assembly 50. It will be noted that the radially extending disc or plate portions 26b and 27b of the fans 26, 27 are pressed into face-to-face contact with the outer disc sides 91a and 92a of the rotor cups 91, 92. Because of the face-to-face engagement of the fans 26, 27 with the rotor cups 91, 92, the metal of the fans 26, 27 can be used to supplement the metal of the rotor cups to provide the flux path for the magnetic field provided by energization of the field coil 60. In particular the metal of the fans 26, 27 increases the width of the magnetic flux gate at the critical locations denoted by the reference numerals 100 (see FIG. 1). The flux lines have been shown diagrammatically in FIG. 1 to show the necking down at the gate locations 100. Accordingly less metal can be used in the rotor cups 91, 92 and the rotor construction reduced in cost without sacrifice of performance because of the utilization of the fan disc portions 26b and 27b to provide a portion of the rotor disc magnetic flux path metal. The fan disc portion 26b, 27b also serve their primary function of supporting the angularly bent, integral fan blades 26f and 27f respectively.

From the foregoing description of the rotor unit R, it is thought to be obvious that this unit is readily assembled by fast, economical, press fit connections of the several components that are mounted on the rotor shaft 30. Secondly, the several components 60, 86, 91, 92, 26, 27 and 50 that are pressed together on the shaft 30 rigidify one another and also provide for the use of certain of the elements to serve dual functions. Furthermore, because of the dual functions of certain of the components a minimum of material is required and a reduction in cost is achieved without any sacrifice in performance.

The design of this alternator unit is such that it is easy and economical to assemble. The two housing end pieces 21, 22 can be used as fixtures for the assembly of their respective components. The slotted, stacked plates 72, that are held together by the pins 74 pressed therethrough, serve as the fixture for the assembly of the windings 71 of the stator unit S. The rotor shaft 30 is the base unit on which the rotor unit R is built up. After assembly of individual units 21, 22, S and R, the rotor unit R has one end of its shaft 30 mounted in one of the end pieces and then the stator unit S is mounted on said one end piece by having its pins 74 seated in mating bores 75 formed in the periphery of said one end piece. Next, the other end piece is mounted on the other end of the rotor shaft and is pressed into engagement with the spacer pins 74 of the stator unit S. Said other end piece also has bores 75 that matingly receive the projecting ends of the spacer pins 74. With the end pieces 21, 22, rotor R and stator S assembled together as a unit, thereafter the through bolts 101 are threaded through aligned bores 102 in the assembled units 21, 22 and stator unit S so as to rigidly fasten the several alternator components together into a unitary structure. It is obvious that it is a very simple task to disassemble the stator unit by removal of the through bolts 101 and then axially separate the components of the alternator assembly for inspection, repair and/or replacement of any of the components thereof.

A novel means of adjustably and pivotally mounting the alternator unit on a support frame is also disclosed. Looking particularly at FIG. 1, it will be noted that each of the housing end pieces 21, 22 includes an integral depending ear 21e and 22e respectively. These ears are each pierced by a cross bore 21g and 22g respectively that are adapted to receive mounting bolt and nut assemblies 106 and 107 respectively. The bolt and nut assemblies 106 and 107 extend from and are supported by a pair of spaced frame lugs 108 and 109 that may be integral ears projecting from an engine block. In order to allow for variation in manufacturing and assembly tolerances it has been found necessary and quite advantageous to provide a means for adjustably compensating for any variations in spacing of the frame lugs 108, 109 and/or the housing ears 21e, 22e. The means utilized to provide an adjustable mounting includes a split sleeve 105 that is pressed into the housing ear bore 21g. This split sleeve 105 is of a length greater than the thickness w (see FIG. 1) of the housing ear 21e so that it can project outwardly of the ear 21e and have one of its ends engage a face of the support lug 108. The other end of the split sleeve 105 may not project beyond the adjacent side face of the housing piece ear 21e depending on the specific position of the support lug 108. With the arrangement shown for anchoring the alternator to the support lugs 108, 109, it is thought to be clear that the bolt and nut assembly 107 will anchor the alternator against any rotational and/or axial shift as regards the axis of bolt 107. While bolt and nut assembly 106 will not lock the housing ear 21e to the support lug 108, still, it will support the alternator and because of the press fit of sleeve 105 in bore 21g, it will tend to resist any rotational movement of the alternator around the axis of bolt 106. It is thought to be clear that the length of the sleeve 105 is such as to provide for all normal variations in tolerances as regards positioning of the frame lugs 108, 109 or variations in spacing of the housing ears 21e, 22e.

Figures 17, 18:
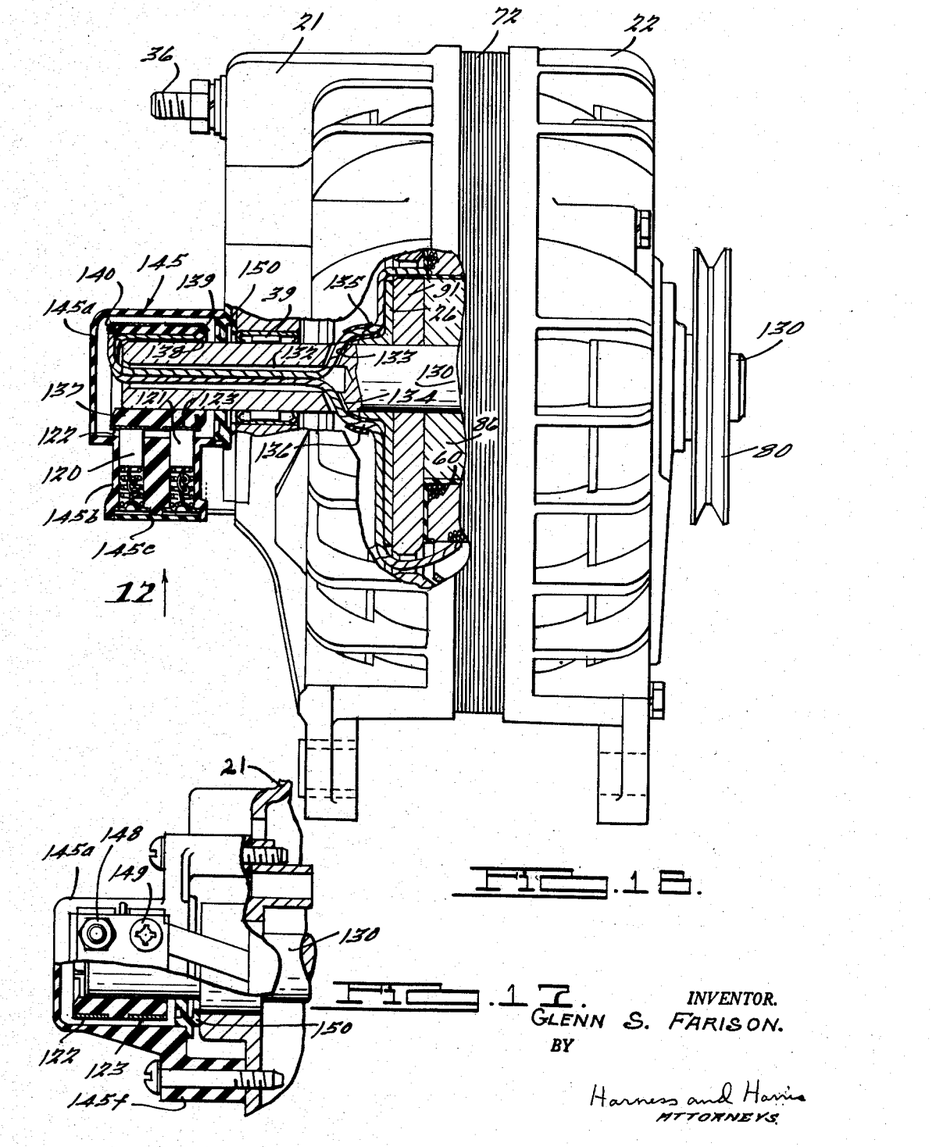
FIG. 17 is a fragmentary sectional elevational view of the brush assembly of FIG. 16, the view being taken along the line 17 of FIG. 16.

FIGS. 16 and 17 show a modified form of this invention wherein the slip ring and brush connections to the rotor coil 60 are arranged so as to provide an explosion proof assembly. This form of the invention is particularly adapted for use in marine installations or any other installations where sparking between the brushes 120, 121 and the rotor shaft mounted slip rings 122 and 123 might present a fire or explosion hazard. The alternator construction shown in FIGS. 16 and 17 is identical to the construction shown in FIG. 1 except for the brush mounting and the wiring connections from the slip rings to the rotor coil 60. In the FIGS. 16 and 17 construction an oversized rotor shaft 130 is used such that the dead end of the rotor shaft 130 that mounts the slip rings 122, 123 projects outwardly of the alternator housing piece 21 so as to permit mounting of the slip ring assembly exteriorly of the housing piece 21. The rotor shaft 130 has a centrally arranged bore 132 that is pierced by radially extending cross bores 133 and 134 adjacent the inner end of the bore 132. Each of the cross bores 133, 134 receives a different one of the field coil leads 135 and 136 respectively. These coil leads extend through the shaft bore 132 and are bent upwardly around the exposed end of the shaft 130 to permit their connection to the slip ring assemblies 122 and 123 respectively. Slip rings 122 and 123 form a portion of the outer peripheral surface of the insulated sleeve 137 that is pressed on to the exposed overhanging end of the rotor shaft 130. Insulator sleeve 137 has an axially extending bore 138 that receives a portion of the free end of the field coil lead in conductor 136. The end of the conductor 136 is connected to the slip ring 123 by a suitable tab or soldered connection 139. The free end of field coil lead in conductor 135 is connected to the slip ring assembly 122 by a suitable soldered or tab connection 140.

The brushes 120 and 121 are carried by a housing 145 that is preferably formed of some insulator material such as a rubber or a resin which housing 145 completely encloses the overhanging dead end of the rotor shaft 130. Housing 145, as can be seen from FIG. 17, includes a cup-like shaft encircling portion 145a from which there depends on the underside a brush mounting compartment 145b that has a removable bottom block 145c to permit inspection, repair and/or replacement of the brush assemblies 120, 121. A flange portion 145f projects radially outwardly from the cup portion 145a and includes bolt receiving portions that sealingly engage the outer face of the housing piece 21 to fixedly connect the brush mounting assembly to the housing of the alternator. Projecting outwardly from the bottom of the brush mounting case 145d are the screw connections 148 and 149 for connecting the brush assemblies to the associated electrical source, such as to battery and to ground. It is thought to be obvious from the foregoing description that the assembly shown in FIGS. 16 and 17 provides an explosion proof brush mounting arrangement wherein the brush to slip ring contact is completely isolated from the adjacent atmosphere so as to prevent any danger of explosion due to brush sparking. A suitable seal 150 is provided between the open end of the cup assembly 145 and the adjacent face of the housing end piece 21. This seal 150 also seals against the outer periphery of the rotor shaft 130. In all respects except as noted immediately above, the alternator unit shown in FIGS. 16 and 17 is identical to that shown in FIG. 1 and therefore additional description of the rotor unit shown in FIGS. 16 and 17 is not thought to be necessary as it would be needless duplication.

It is thought to be obvious from a consideration of the foregoing description of this invention that this alternator device is designed in such a manner that the minimum amount of material and the maximum simplicity of design have been combined to give an improved type of alternator rectifier direct current generating mechanism. To reduce the weight of the device to a minimum, the non-magnetizable elements thereof, such as the housing pieces 21, 22 are preferably formed of slotted light weight castings such as aluminum or the like. The magnetizable rotor cups 91, 92 are of a magnetizable material such as steel and are of minimum material thickness due to the fact that the fan elements 26, 27 are arranged to add their material, which is magnetizable such as steel, to the thickness of the rotor cups 91, 92 to thereby provide the flux path for the field coil flux. The stacked plates 72 of the stator unit S are of a magnetizable material such as steel and their outer peripheral portions are utilized as a surface of the housing unit so as to reduce the amount of metal in the alternator device. The other elements of this alternator have been designed so as to utilize their materials to the fullest extent to obtain maximum performance with reduced cost.

FIG. 6 shows a perspective view of the rotor R that is shown in detail in FIGS. 1, 7, 9 and 11. From FIGS. 7 and 11 particularly, it will be noted that the axially extending pole pieces 91c and 92c are of what is termed concentric pole construction. This is evident from a consideration of FIG. 7 wherein it will be noted that the radius of curvature $r_o$ for the outer faces of the poles 91c is swung from the geometric center 91f of the rotor pole cup 91. Likewise, the radius of curvature $r_i$ for the inner faces of the poles 91c is also swung from the geometrical center 91f of the rotor pole cup 91. The poles 92c of the complementary rotor piece 92 are formed in the same manner as the poles 91c of the rotor piece 91. It will be noted that the rotor piece 91c is also pierced by a pair of bores 91d and 91e that are adapted to provide the passages for connection of the field coil leads 61, 62 to the slip ring assembly 50 (see FIG. 1).

Figure 7:
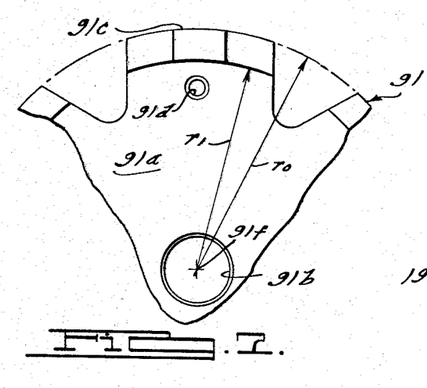
FIG. 7 is an enlarged, fragmentary, elevational view of the pole portions of the rotor cups used with the form of rotor shown in FIG. 6.
Figure 8:
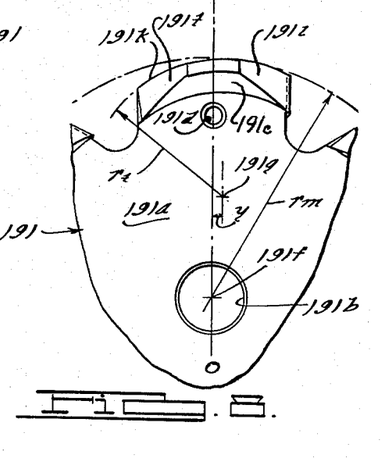
FIG. 8 is an enlarged, fragmentary, elevational view of a modified form of pole portion that can be used on the rotor cup of this alternator-rectifier unit.

FIG. 8 shows a modified form of rotor pole piece construction that is known as the tapered or unsymmetrical pole type. In this form of rotor piece the poles 191c and their complementary poles on the mating pole piece (not shown) are formed with leading and trailing portions $191_l$ and $191_t$ that are unsymmetrical with respect to the geometrical center 191f of the rotor pole piece 191. This unsymmetrical or tapered pole is formed by swinging and arc of radius $r_t$ from a center of curvature 191g that is offset by distance $y$ from the centerline O—O of the pole 191c. The radius $r_1$ is considerably shorter than the radius $r_m$ that is swung from the geometrical center of the rotor pole piece 191 and as a result there is considerably more curvature to the outer face 191k of the poles 191c. The tapered pole configuration shown in FIG. 8 has been found to give a better magnetic flux distribution and have better noise damping properties than the FIG. 7 form although the FIG. 8 form may be slightly more expensive to manufacture than the FIG. 7 form. Because of the better flux distribution with the FIG. 8 form of pole, it has been found that a greater current output is achieved in alternator units that have the tapered pole (FIG. 8) as opposed to the concentric pole configuration (FIG. 7).

I claim:

1. In an alternator-rectifier electric current generating system, an alternator comprising a rotor shaft, a rotor hub drivingly mounted on said rotor shaft, a magnetic field coil wound about said hub, rotor shaft mounted magnetizable poles adjacent said hub and field coil and arranged with portions thereof in abutting engagement with said hub to provide alternate positive and negative polarity poles adjacent the outer periphery of said field coil, and a pair of spaced rotor cooling fan means carried by said rotor shaft sandwiching said poles therebetween and having magnetizable portions in abutting engagement with each of said poles to provide a portion of the field coil induced magnetic flux path for said poles.

2. In an alternator-rectifier electric current generating system, an alternator comprising a rotor shaft, a rotor hub of magnetizable material drivingly mounted on said rotor shaft, a magnetic field coil wound circumferentially about said hub, rotor shaft mounted magnetizable pole pieces of cup-shaped cross sectional configuration surrounding said hub and field coil and arranged with first portions thereof in abutting engagement with said hub and second portions providing alternate positive and negative polarity poles encircling the outer periphery of said field coil, a pair of spaced rotor cooling fan means carried by said rotor shaft sandwiching said pole pieces therebetween and having magnetizable portions in abutting engagement with each of said pole first portions to provide a portion of the field coil induced magnetic flux path for said poles.

3. In an alternator-rectifier direct current generating system, an alternator comprising a rotor shaft, a rotor hub of magnetizable material drivingly mounted on said rotor shaft, a magnetic field coil wound circumferentially about said hub, rotor shaft mounted magnetizable pole pieces of cup-shaped cross sectional configuration surrounding said hub and field coil and arranged with first radially extending portions thereof in abutting engagement with said hub and second axially extending portions providing alternate interspaced positive and negative polarity poles encircling the outer periphery of said field coil, and a pair of rotor cooling fan means carried by said rotor shaft sandwiching said pole pieces therebetween and having magnetizable portions in abutting engagement with each of said pole first portions to provide a portion of the field coil induced magnetic flux path for said poles.

4. In an alternator-rectifier direct current generating system, an alternator comprising a rotor shaft, a rotor hub of magnetizable material drivingly mounted on said rotor shaft, a magnetic field coil wound circumferentially about said hub, rotor shaft mounted magnetizable pole pieces of cup-shaped cross sectional configuration surrounding said hub and field coil and arranged with first radially extending portions thereof in abutting engagement with said hub and second axially extending portions providing alternate interspaced positive and negative polarity poles encircling the outer periphery of said field coil, and a pair of rotor cooling fan means carried by said rotor shaft sandwiching said pole pieces therebetween and having magnetizable portions in abutting engagement with each of said pole first portions to provide a portion of the field coil induced magnetic flux path for said poles, said fan means comprising a sheet metal plate having an axially extending hub portion drivingly connected to said rotor shaft and axially extending formation on said plate providing centrifugal fan blading to centrifuge rotor cooling air across the rotor unit.

5. In an alternator-rectifier electric current generating system, an alternator comprising a rotor shaft, a rotor hub of magnetizable material drivingly mounted on said rotor shaft, a magnetic field coil wound about said hub, rotor shaft mounted magnetizable pole pieces of cup-shaped cross sectional configuration surrounding said hub and field coil and arranged with first portions thereof in abutting engagement with said hub and second portions providing alternate positive and negative polarity poles encircling the outer periphery of said field coil, a pair of rotor cooling fan means carried by said rotor shaft sandwiching said pole pieces therebetween and having magnetizable portions in abutting engagement with each of said pole pieces to provide a portion of the field coil induced magnetic flux path for said poles, and a stator unit having inductor windings thereon surrounding said rotor poles.

6. In an alternator-rectifier electric current generating system, an alternator comprising a pair of cup-like housing pieces journaling therein a rotor shaft, a rotor hub of magnetizable material drivingly mounted on said rotor shaft, a magnetic field coil wound about said hub, rotor shaft mounted magnetizable pole pieces of cup-shaped cross sectional configuration surrounding said hub and field coil and arranged with first portions thereof in abutting engagement with said hub and second portions providing alternate positive and negative polarity poles encircling the outer periphery of said field coil, a pair of rotor cooling fan means carried by said rotor shaft sandwiching said pole pieces therebetween and having magnetizable portions in abutting engagement with each of said pole pieces to provide a portion of the field coil induced magnetic flux path for said poles, and a stator unit having inductor windings thereon surrounding said rotor poles and connected between said housing pieces, said stator unit comprising a plurality of stacked plates interconnected by a plurality of connector pin elements extending through said plates and projecting beyond the sides of said stacked plates a predetermined distance to space said housing pieces.

7. In an alternator-rectifier electric current generating system, an alternator comprising a rotor shaft, a rotor hub of magnetizable material drivingly mounted on said rotor shaft, a magnetic field coil wound about said hub, rotor shaft mounted magnetizable pole pieces of cup-shaped cross sectional configuration surrounding said hub and field coil and arranged with first portions thereof in abutting engagement with said hub and second portions providing alternate positive and negative polarity poles encircling the outer periphery of said field coil, a pair of rotor cooling fan means carried by said rotor shaft sandwiching said pole pieces therebetween and having magnetizable portions in abutting engagement with each of said pole pieces to provide a portion of the field coil induced magnetic flux path for said poles, a stator unit having inductor windings thereon surrounding said rotor poles, and a slip ring assembly mounted on said rotor shaft and conductively connected to said field coil to provide for energization thereof.

8. In an alternator-rectifier electric current generating system, an alternator comprising a rotor shaft, a rotor hub of magnetizable material drivingly mounted on said rotor shaft, a magnetic field coil wound about said hub, rotor shaft mounted magnetizable pole pieces of cup-shaped cross sectional configuration surrounding said hub and field coil and arranged with first portions thereof in abutting engagement with said hub and second portions providing alternate positive and negative polarity poles encircling the outer periphery of said field coil, a pair of rotor cooling fan means carried by said rotor shaft sandwiching said pole pieces therebetween and having magnetizable portions in abutting engagement with each of said pole pieces to provide a portion of the field coil induced magnetic flux path for said poles, a stator unit having inductor windings thereon surrounding said rotor poles, a slip ring assembly mounted on said rotor shaft and conductively connected to said field coil to provide for energization thereof, said slip ring assembly comprising a collar of insulator material mounted on and surrounding said rotor shaft, a pair of spaced conductor rings mounted on and encircling said collar, and means on said spaced conductor rings conductively connected to and completing an electrical circuit through said field coil.

9. In an alternator-rectifier electric current generating system, an alternator comprising a rotor shaft, a rotor hub of magnetizable material drivingly mounted on said rotor shaft, a magnetic field coil wound about said hub, rotor shaft mounted magnetizable pole pieces of cup-shaped cross sectional configuration surrounding said hub and field coil and arranged with first portions thereof in abutting engagement with said hub and second portions providing alternative positive and negative polarity poles encircling the outer periphery of said field coil, a pair of rotor cooling fan means carried by said rotor shaft sandwiching said pole pieces therebetween and having magnetizable portions in abutting engagement with each of said pole pieces to provide a portion of the field coil induced magnetic flux path for said poles, a stator unit having inductor windings thereon surrounding said rotor poles, and a slip ring assembly mounted on said rotor shaft and conductively connected to said field coil to provide for energization thereof, said slip ring assembly comprising a right angularly shaped flanged collar having a pair of spaced conductor rings mounted on the right angularly arranged portions of the collar, and means on said spaced conductor rings conductively connected to and completing the electrical circuit through said field coil.

10. In an alternator-rectifier electric current generating system, an alternator comprising a rotor shaft, a rotor hub of magnetizable material drivingly mounted on said rotor shaft, a magnetic field coil wound about said hub, rotor shaft mounted magnetizable pole pieces of cup-shaped cross sectional configuration surrounding said hub and field coil and arranged with first portions thereof in abutting engagement with said hub and second portions providing alternate positive and negative polarity poles encircling the outer periphery of said field coil, a pair of rotor cooling fan means carried by said rotor shaft sandwiching said pole pieces therebetween and having magnetizable portions in abutting engagement with each of said pole pieces to provide a portion of the field coil induced magnetic flux path for said poles, a stator unit having inductor windings thereon surrounding said rotor poles, a slip ring assembly mounted on said rotor shaft and conductively connected to said field coil to provide for energization thereof by way of conductor means extending through an axially directed bore in said rotor shaft.

11. In an alternator-rectifier electric current generating system, an alternator comprising a rotor shaft, a rotor hub of magnetizable material drivingly mounted on said rotor shaft, a magnetic field coil wound about said hub, rotor shaft mounted magnetizable pole pieces of cup-shaped cross sectional configuration surrounding said hub and field coil and arranged with first portions thereof in abutting engagement with said hub and second portions providing alternate positive and negative polarity poles encircling the outer periphery of said field coil, a pair of rotor cooling fan means carried by said rotor shaft sandwiching said pole pieces therebetween and having magnetizable portions in abutting engagement with each of said pole pieces to provide a portion of the field coil induced magnetic flux path for said poles, a stator unit having inductor windings thereon surrounding said rotor poles, a slip ring assembly mounted on said rotor shaft and conductively connected to said field coil to provide for energization thereof, and a pair of slotted housing end pieces enclosing said fan means and mounted on and journaling said rotor shaft with the adjacent end faces of said end pieces engaged with and spaced by said stator unit.

12. In an alternator-rectifier electric current generating system, an alternator comprising a rotor shaft, a rotor hub of magnetizable material drivingly mounted on said rotor shaft, a magnetic field coil wound about said hub, rotor shaft mounted magnetizable pole pieces of cup-shaped cross sectional configuration surrounding said hub and field coil and arranged with first portions thereof in abutting engagement with said hub and second portions providing alternate positive and negative polarity poles encircling the outer periphery of said field coil, a pair of rotor cooling fan means carried by said rotor shaft sandwiching said pole pieces therebetween and having magnetizable portions in abutting engagement with each of said pole pieces to provide a portion of the field coil induced magnetic flux path for said poles, a stator unit having inductor windings thereon surrounding said rotor poles, said stator unit comprising a plurality of stacked plates interconnected by a plurality of connector pin elements extending through said plates and projecting beyond the sides of said stacked plates a predetermined distance, a slip ring assembly mounted on said rotor shaft and conductively connected to said field coil to provide for energization thereof, and a pair of slotted housing end pieces enclosing said fan means and mounted on and journaling said rotor shaft with the adjacent end faces of the end pieces engaged with and spaced by the connector pin elements of said stator unit.

13. In an alternator-rectifier electric current generating system, an alternator comprising a rotor shaft, a rotor hub of magnetizable material drivingly mounted on said rotor shaft, a magnetic field coil wound about said hub, rotor shaft mounted magnetizable pole peices of cup-shaped cross sectional configuration surrounding said hub and field coil and arranged with first portions thereof in abutting engagement with said hub and second portions providing alternate positive and negative polarity poles encircling the outer periphery of said field coil, a pair of rotor cooling fan means carried by said rotor shaft sandwiching said pole pieces therebetween and having magnetizable portions in abutting engagement with each of said pole pieces to provide a portion of the field coil induced magnetic flux path for said poles, a stator unit having inductor windings thereon surrounding said rotor poles, a slip ring assembly mounted on said rotor shaft and conductively connected to said field coil to provide for energization thereof, a pair of slotted housing end pieces enclosing said fan means and mounted on and journaling said rotor shaft with the adjacent end faces of said end pieces engaged with and spaced by said stator unit, one of said housing end pieces mounting a pair of conductor brush assemblies arranged to slidably engage the pair of conductor rings of the slip ring assembly to provide for the conduction of electrical energy thereto.

14. In an alternator-rectifier electric current generating system, an alternator comprising a rotor shaft, a rotor hub of magnetizable material drivingly mounted on said rotor shaft, a magnetic field coil wound about said hub, rotor shaft mounted magnetizable pole pieces of cup-shaped cross sectional configuration surrounding said hub and field coil and arranged with first portions thereof in abutting engagement with said hub and second portions providing alternate positive and negative polarity poles encircling the outer periphery of said field coil, a pair of rotor cooling fan means carried by said rotor shaft sandwiching said pole pieces therebetween and having magnetizable portions in abutting engagement with each of said pole pieces to provide a portion of the field coil induced magnetic flux path for said poles, a stator unit having inductor windings thereon surrounding said rotor poles, a slip ring assembly mounted on said rotor shaft and conductively connected to said field coil to provide for energization thereof, a pair of slotted opposed, cup-like housing end pieces enclosing said fan means and mounted on and journaling said rotor shaft with the adjacent end faces of said end pieces engaged with and spaced by said stator unit, one of said housing end pieces mounting a pair of conductor brush assemblies arranged to slidably engage the pair of conductor rings of the slip ring assembly to provide for the conduction of electrical energy thereto, and rectifier means mounted on one of the housing end pieces and connected to the stator unit inductor windings to convert the induced alternating current of the stator windings to direct current.

15. In an alternator-rectifier direct current generating device, an alternator comprising a rotor shaft, a rotor hub of magnetizable material drivingly mounted on said rotor shaft, a magnetic field coil mounted on said hub, rotor shaft mounted magnetizable pole pieces of cup-shaped cross sectional configuration surrounding said hub and field coil and arranged with radially directed first portions thereof in abutting engagement with said hub and axially directed, peripherally disposed second portions providing alternate positive and negative polarity poles encircling the outer periphery of said field coil, rotor cooling fan means carried by said rotor shaft, a stator unit having windings thereon surrounding said rotor poles, a slip ring assembly mounted on said rotor shaft and conductively connected to said field coil to provide for energization thereof, a housing unit journaling said rotor shaft, said housing unit mounting a pair of brush assemblies that are engageable with insulator spaced ring portions of said slip ring assembly to transmit electrical energy through said field coil to effect magnetization thereof, current rectifier means carried by said housing and connected to the windings of the stator unit to provide for direct current output therefrom, and a noise damping slotted compressible ring arranged between the field coil and the surrounding axially directed rotor poles and engaged with said rotor poles to provide a friction damping means for the rotor poles.

16. In an alternator-rectifier direct current generating device, an alternator comprising a rotor shaft, a rotor hub of magnetizable material drivingly mounted on said rotor shaft, a magnetic field coil mounted on said hub, rotor shaft mounted magnetizable pole pieces of cup-shaped cross sectional configuration surrounding said hub and field coil and arranged with radially directed first portions thereof in abutting engagement with said hub and axially directed, peripherally disposed second portions providing alternate positive and negative polarity poles encircling the outer periphery of said field coil, rotor cooling fan means carried by said rotor shaft, a stator unit having windings thereon surrounding said rotor poles, a slip ring assembly mounted on said rotor shaft and conductively connected to said field coil to provide for energization thereof, a housing unit journaling said rotor shaft, said housing unit mounting a pair of brush assemblies that are engageable with insulator spaced portions of said slip ring assembly to transmit electrical energy through said field coil to effect magnetization thereof, current rectifier means carried by said housing and connected to the windings of the stator unit to provide for direct current output therefrom, and a noise damping slotted compressible ring arranged between the field coil and the surrounding axially directed rotor poles and engaged with said poles to provide a friction damping means for the rotor poles, said noise damping slotted ring compressing a deformable metal ring arranged concentrically between the outer periphery of the field coil and the inner periphery of said axially directed rotor poles to exert an expanding pressure contact on the poles to frictionally damp any movement thereof.

17. In an alternator-rectifier direct current generating device, an alternator comprising a rotor shaft, a rotor hub of magnetizable material drivingly mounted on said rotor shaft, a magnetic field coil mounted on said hub, rotor shaft mounted magnetizable pole pieces of cup-shaped cross sectional configuration surrounding said hub and field coil and arranged with radially directed first portions thereof in abutting engagement with said hub and substantially axially directed second portions providing alternate positive and negative polarity poles encircling and spaced from the outer periphery of said field coil, and a noise damping ring of resilient material compressed against the axially directed poles and exerting a friction damping effect thereon.

18. In an alternator-rectifier direct current generating device, an alternator comprising a rotor shaft, a rotor hub of magnetizable material drivingly mounted on said rotor shaft, a magnetic field coil wound about said hub, rotor shaft mounted magnetizable pole pieces of cup-shaped cross sectional configuration surrounding said hub and field coil and arranged with radially directed first portions thereof in abutting engagement with said hub and axially directed second portions providing alternate positive and negative polarity poles encircling and spaced from the outer periphery of said field coil, and a vibration ring arranged concentrically between said poles and said coil and comprising a metal strip compressed beneath said poles, said strip being arched outwardly in transverse cross section and having a plurality of transversely extending, circumferentially spaced slots.

19. A slip-ring assembly for a rotor shaft comprising an open ended sleeve of insulator material having a right angularly disposed, outwardly directed flange of insulator material at one end thereof, an axial extending first ring of conductor material surrounding and mounted on said sleeve of insulator material, a second radially extending ring of insulator material mounted on and extending around said flange of insulator material and spaced from said first conductor ring, and means on each of said conductor rings to conductively connect a conductor wire thereto.

20. A method of making a slip ring assembly comprising forming an open ended sleeve of conductor material with a right angularly disposed, radially directed, outwardly extending flange at one end thereof, bonding a liner of insulator material to the interior surface of the sleeve and connected flange, and thereafter cutting away a continuous circumferentially extending ring of the conductor sleeve to provide two insulator spaced conductor slip rings.

21. A method of making a slip ring assembly comprising forming an open ended sleeve of conductor material with a right angularly disposed, radially directed, outwardly extending flange at one end thereof, bonding a liner of insulator material to the interior surface of the sleeve and connnected flange, and thereafter cutting away a continuous circumferentially extending ring of the conductor sleeve to provide two insulator spaced conductor slip rings, said sleeve having the portion thereof that is cut away located at the fillet portion connecting the sleeve to the right angularly disposed flange portion.

References Cited by the Examiner

UNITED STATES PATENTS

| | | | |
|---|---|---|---|
| 1,683,676 | 9/28 | Jungk | 310—232 |
| 1,870,236 | 8/32 | Chervenka | 310—232 |
| 2,383,669 | 8/45 | Moore | 310—68.4 |
| 2,583,124 | 1/52 | Sampietro | 310—263 X |
| 2,588,175 | 3/52 | Stewart | 310—168 |
| 2,653,208 | 9/53 | Ballman | 310—217 X |
| 2,662,988 | 12/53 | McKim | 310—91 |
| 2,795,715 | 6/57 | Gilchrist | 310—261 |
| 2,852,711 | 9/58 | Derner | 310—269 |
| 2,935,364 | 5/60 | Smith | 308—189 |
| 2,953,417 | 9/60 | Horberg | 308—189 |
| 2,970,236 | 1/61 | De Paul | 310—91 |
| 3,078,409 | 2/63 | Bertsche | 310—68 X |

FOREIGN PATENTS

| | | |
|---|---|---|
| 422,072 | 1/35 | Great Britain. |
| 679,750 | 9/52 | Great Britain. |

MILTON O. HIRSHFIELD, *Primary Examiner.*

DAVID X. SLINEY, *Examiner.*